(12) United States Patent
Jing et al.

(10) Patent No.: US 6,828,267 B2
(45) Date of Patent: Dec. 7, 2004

(54) MAGNESIUM CHLORIDE-ALCOHOL CARRIER AND OLEFIN POLYMERIZATION CATALYST COMPONENTS MADE FROM THE SAME

(75) Inventors: Zhenhua Jing, Beijing (CN); Rong Junfeng, Beijing (CN); Wei Zhang, Beijing (CN); Xiaoyu Hong, Beijing (CN); Xuhua Zhou, Beijing (CN)

(73) Assignees: China Petro Chemical Corporation, Beijing (CN); Research Institute of Petroleum Processing Sinopec, Beijing (CN)

( * ) Notice: Subject to any disclaimer, the term of this patent is extended or adjusted under 35 U.S.C. 154(b) by 250 days.

(21) Appl. No.: 09/863,100

(22) Filed: May 18, 2001

(65) Prior Publication Data

US 2002/0035028 A1 Mar. 21, 2002

(30) Foreign Application Priority Data

May 19, 2000 (CN) .......................... 00107485

(51) Int. Cl.$^7$ .......................... B01J 31/00; B01J 37/00; C08F 4/02; C08F 4/60
(52) U.S. Cl. .......................... 502/103
(58) Field of Search .......................... 502/103

(56) References Cited

U.S. PATENT DOCUMENTS

| 4,298,718 A | | 11/1981 | Mayr et al. .................. 526/125 |
| 4,421,674 A | | 12/1983 | Invernizzi et al. .......... 502/154 |
| 4,495,338 A | | 1/1985 | Mayr et al. .................. 526/125 |
| 4,952,737 A | | 8/1990 | Inkrott ....................... 568/851 |
| 5,250,282 A | * | 10/1993 | Kresge et al. .............. 423/705 |
| 5,300,277 A | * | 4/1994 | Kresge et al. .............. 423/703 |
| 5,346,685 A | * | 9/1994 | Moini ........................ 423/718 |

FOREIGN PATENT DOCUMENTS

| CN | 1047302 | | 11/1990 | |
| CN | 8-20607 | | 1/1996 | |
| EP | 0395083 A3 | * | 4/1990 | ............. C08F/4/02 |
| EP | 0 395 083 | | 10/1990 | ............. C08F/4/02 |
| EP | 700 936 | | 3/1996 | |
| EP | 0 717 055 | | 6/1996 | ........... C08F/10/02 |
| WO | PCT/EP98/01680 | | 10/1998 | |

OTHER PUBLICATIONS

English translation of Abstract of Chinese Application No. 8–20607.
English translation of Abstract of Chinese Application No. CN1047302.

* cited by examiner

Primary Examiner—Mark L. Bell
Assistant Examiner—Jennine M. Brown
(74) Attorney, Agent, or Firm—Darby & Darby

(57) ABSTRACT

Described are a MgCl$_2$ based carrier containing Ti(OR)$_4$ and ROH, wherein R is C$_1$~C$_7$alkyl, and solid catalyst components made from said carrier. The carrier and the solid catalyst components according to the present invention are characterized in that their X-rays powder diffraction spectra, one or two main diffraction lines or a halo appears at 2θ of 2~14° and in the range of 2θ of 14~50°, there are the characteristic diffraction lines of anhydrous α-MgCl$_2$. The carrier according to the present invention is directly obtained by reacting anhydrous magnesium chloride with an alcohol and can be used to prepare solid catalyst components without dealcoholization, and the solid catalyst components exhibit high polymerization activity when employed for polymerizing ethylene.

16 Claims, 2 Drawing Sheets

MAGNESIUM CHLORIDE-ALCOHOL CARRIER AND OLEFIN POLYMERIZATION CATALYST COMPONENTS MADE FROM THE SAME

FIELD OF THE INVENTION

The present invention relates to an active magnesium chloride based carrier containing an alcohol and olefin polymerization catalyst components made from the same, and more particularly, to an active magnesium chloride based carrier used for olefin polymerization and solid catalyst components for olefin polymerization made from the same.

BACKGROUND OF THE INVENTION

Olefin polymerization catalysts prepared by supporting a titanium halide compound onto active anhydrous magnesium chloride have been described in a number of patent documents. For example, U.S. Pat. Nos. 4,298,718 and 4,495,338 disclose an active magnesium chloride characterized in that in its X-rays powder diffraction spectrum, the characteristic diffraction lines of the inactive anhydrous $\alpha$-$MgCl_2$ all become diffused halos, the most intense diffraction line which is present in the powder diffraction spectrum of the anhydrous $\alpha$-$MgCl_2$ does not appear and in its place, a halo of the halogen which is the most intense appears, and such a most intense halo of the halogen shifts to a smaller angle relative to the most intense diffraction line of the inactive halide.

It is well known that the active $MgCl_2$ is prepared by reacting anhydrous $\alpha$-$MgCl_2$ with an alcohol to form an adduct and then a titanium halide compound is supported onto such an adduct to form a solid catalyst component for olefin polymerization. For example, Chinese Patent Application Publication No. CN1047302A discloses an active magnesium halide based solid catalyst component, having an X-rays powder diffraction spectrum where a) halos appear at 2θ of 35° and 14.95° (the characteristic diffraction lines of $MgCl_2$) or b) the halo at 2θ of 350 is substituted by a halo with the maximum intensity between 33.5° and 352θ and the diffraction line at 2θ of 14.95° is absent. Said catalyst component is obtained by partially dealcoholizing a $MgCl_2$• alcohol adduct to an alcohol content of less than 2 mole so as to form a carrier and then reacting such a carrier with a titanium halide compound.

U.S. Pat. No. 4,421,674 discloses a process for the preparation of a supported catalyst for olefin polymerization, comprising the steps of providing a solution consisting of anhydrous $MgCl_2$ dissolved in an alcohol, spray drying said solution by spraying the latter into a flow of nitrogen so as to partially dealcoholize to form a carrier containing 1.5–20% by weight of alcohol and having an X-rays powder diffraction spectrum wherein the most intense diffraction line appears at 2θ of 8.15°, there are also the characteristic diffraction lines at 2θ of 9.65° and 13.15°, and the characteristic diffraction lines of anhydrous crystalline $\alpha$-$MgCl_2$ are absent. There is only one most intense diffraction line at 2θ of 8.15° in the power diffraction spectrum of the catalyst made from such a carrier and no other diffraction lines appear.

EP700936A discloses a process for producing a solid catalyst component for olefin polymerization, which comprises the preparation of a $MgCl_2$• EtOH adduct, comprising the steps of: (A) preparing a $MgCl_2$• mROH mixture where R is $C_1$~$C_{10}$ alkyl and m is 3.0~6.0; (B) spray-cooling said mixture to obtain a solid adduct which has the same composition as said mixture; (C) partially dealcoholizing said adduct to a molar ratio of alcohol/$MgCl_2$ in the adduct of 0.4~2.8:1. The adduct (C) prepared according to this document has an X-rays powder diffraction spectrum wherein a novel peak does not occur at a diffraction angle 2θ=7~8° as compared with the X-rays powder diffraction spectrum of the solid component (B), or even if it occurs, the intensity of the novel peak is 2.0 times or less the intensity of the highest peak present in the diffraction angle 2θ=8.5~9° of the X-rays powder diffraction spectrum of the solid component (C). FIG. 2 of this document shows the typical X-rays powder diffraction spectrum of the adduct prepared in step (B), wherein the most intense diffraction line appears at 2θ of 8.8° and two less intense diffraction lines appear at 2θ of 9.5~10° and 13°, respectively. FIG. 3 of this document shows the typical X-rays powder diffraction spectrum of the adduct prepared in step (C), wherein the diffraction line at 2θ of 7~8° is absent, the most intense diffraction line appears at 2θ of 8.8° and two less intense diffraction lines appear at 2θ of 9.5~10° and 11~11.5°, respectively, with the lines being somewhat broadened. In addition, Japanese Patent Application Laid-open No. Hei 8-20607 similarly discloses a process for producing an active magnesium chloride carrier as mentioned above.

WO98/44009 discloses a magnesium chloride• alcohol adduct suitable for preparing catalysts for synthesizing stereoregular polyolefins. Said adduct has a formula of $MgCl_2$•$mROH$•$nH_2O$, in which R is $C_1$~$C_{10}$alkyl, 2=m=4.2, 0=n, =0.7. In the X-rays powder diffraction spectrum of the adduct, three diffraction lines appear in the range of 2θ between 5° and 15°, respectively at 2θ of 8.8±0.2°, 9.4±0.2° and 9.8±0.2°, the most intense diffraction line being the one at 2θ=8.8±0.2°, the intensity of the other two diffraction lines being at least 0.2 times the intensity of the most intense diffraction line. Said adduct is prepared by dispersing magnesium chloride in an inert liquid, adding an alcohol in a gaseous phase at elevated temperature so as to completely melt thus-obtained adduct, emulsifying the molten adduct in an inert liquid medium and finally quenching the emulsion, thus obtaining the solid adduct having the special X-rays powder diffraction spectrum as mentioned above.

The object of the present invention is to provide a novel magnesium chloride based carrier containing an alcohol and having a special X-rays powder diffraction spectrum, which can be directly obtained by reacting an alcohol with magnesium chloride.

Another objection of the present invention is to provide a solid catalyst component made from the above carrier.

SUMMARY OF THE INVENTION

Figure 1:
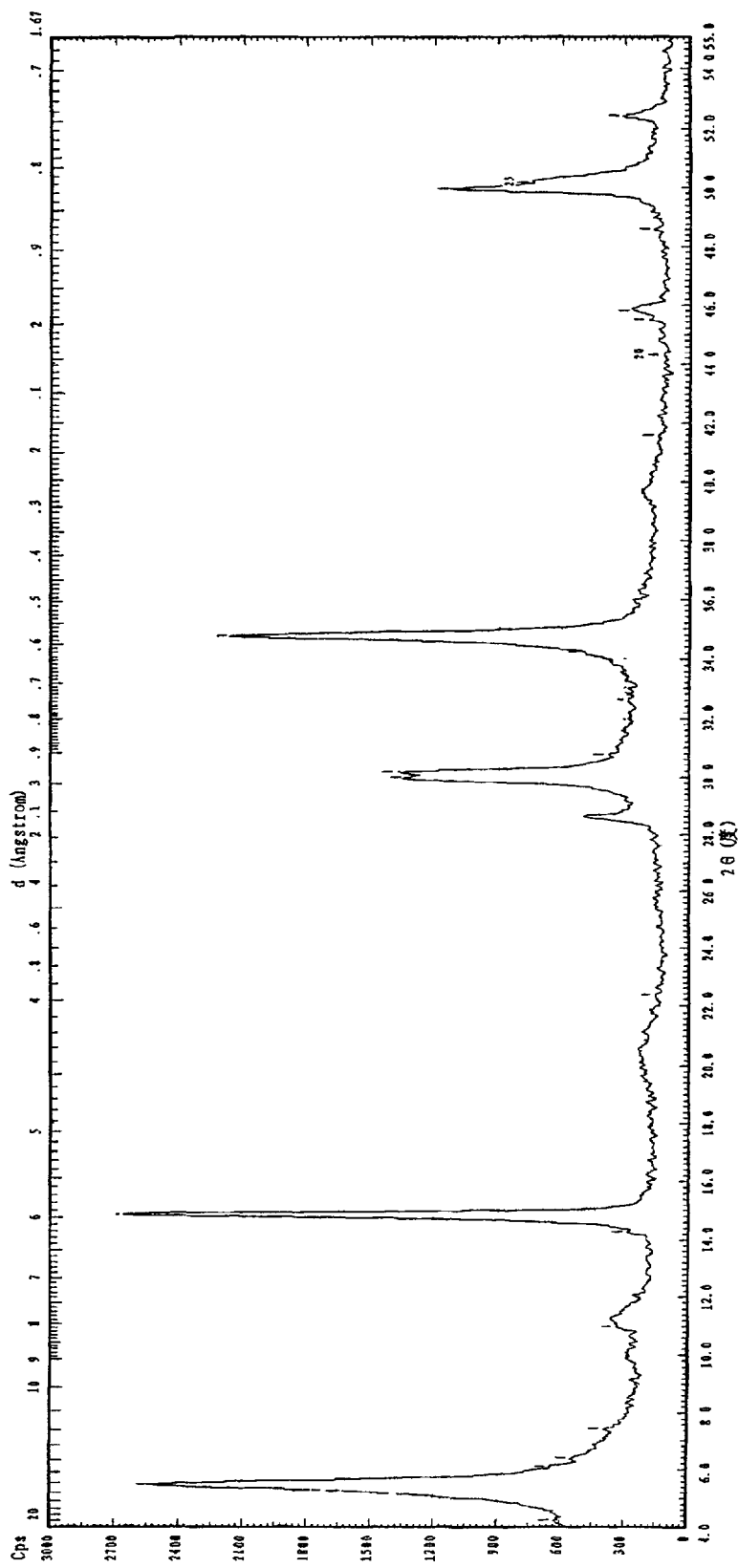
FIG. 1 is an X-rays powder diffraction spectrum of the carrier C obtained in Example 3.

The present inventors have now found a catalytically active carrier containing magnesium chloride, a titanium alkoxide compound and an alcohol, with the alcohol content in said carrier being extremely small. The carrier according to the present invention is characterized in that in its X-rays powder diffraction spectrum, one or two main diffraction lines appear at 2θ of 2~14° and in the range of 2θ of 14~50°, there are the characteristic diffraction lines of anhydrous $\alpha$-$MgCl_2$. The present inventors have surprisingly found that the solid catalyst component made from the carrier according to the present invention possesses high polymerization activity.

DETAILED DESCRIPTION OF THE INVENTION

The titanium alkoxide compounds which may be used in the present invention is represented by the formula $Ti(OR)_4$, and the alcohol which may be used in the present invention is represented by the formula ROH, wherein R is $C_1 \sim C_7$ alkyl group, preferably $C_2 \sim C_5$ alkyl. The molar ratio of $Ti(OR)_4$ to $MgCl_2$ in the carrier according to the present invention may be 0.01~0.1, preferably 0.01~0.05, and that of ROH to $MgCl_2$ may be 0.1~1.0, preferably 0.2~0.6.

The titanium alkoxide compounds used in the carrier according to the present invention can be selected from the group consisting of titanium ethoxide, titanium propoxide and titanium butoxide, and mixtures thereof, with titanium butoxide being the most preferred. The alcohol used in the carrier according to the present invention can be selected from the group consisting of ethanol, propanol, butanol, hexanol, the isomers thereof and mixtures thereof, with n-butanol, isobutanol and propanol being preferred.

The carrier according to the present invention contains an alcohol in an extremely small amount, and is obtained without dealcoholization. The carrier according to the present invention is characterized in its X-rays powder diffraction spectrum wherein in the range of 2θ of 14~50°, there are the characteristic diffraction lines of anhydrous α-$MgCl_2$ and one or two new diffraction lines appear at 2θ of 2~14°, and however, the 2θ diffraction angles and the number of the novel diffraction lines vary depending on the alcohol concretely used. The intensity of the new diffraction line or the intensity of the more intense one of the new diffraction lines is 0.2~1.5 times that of the diffraction line at 2θ of 14.9±0.4°. The diffraction line shifts to a smaller 2θ angle as the carbon number of the alcohol in the carrier increases, and if there are two diffraction lines at 2θ of 2~14°, the main diffraction line which is more intense shifts to a smaller 2θ angle. By way of example in the present invention, one diffraction line appears at 2θ of 7.4±0.4° when the alcohol used in the carrier is ethanol; one diffraction line which is more intense appears at 2θ of 5.9±0.4° and one diffraction line which is less intense appears at 2θ of 10.9±0.4° when the alcohol used in the carrier is propanol; one intense diffraction line appears at 2θ of 5.4±0.4° when the alcohol used in the carrier is butanol; and one diffraction line appears at 2θ of 4.2±0.4° when the alcohol used in the carrier is hexanol. The less intense diffraction line referred to herein has an intensity of 0.05~0.5 times that of the more intense one. When the alcohol used in the carrier has a larger carbon number, for example octanol, there appears no diffraction line at 2θ of 2~14°, and the catalyst component made from such a carrier is extremely less active.

The carrier according to the present invention is suitable for preparing solid catalyst components for olefin polymerization by reacting with a transition metal compound, and thus-obtained component is characterized by its X-rays powder diffraction spectrum wherein one or two diffraction lines or a halo appears at 2θ of 2~14° and in the range of 2θ of 14~50°, there are the characteristic diffraction lines of anhydrous α-$MgCl_2$.

The solid catalyst component provided according to the present invention has an X-rays powder diffraction spectrum similar to that of the carrier according to the present invention, wherein the positions of the diffraction line(s) at 2θ of 2~14° is the same as in the carrier, with the main diffraction line being broadened and its intensity tending to decrease compared to that of the carrier. The intensity of the main diffraction line or the intensity of the more intense one of the main diffraction lines appearing in such a range is 0.10~1.5 times that of the diffraction line at 2θ of 14.9±0.4°. A halo appears at 2θ of 5~7° in the X-rays powder diffraction spectrum of the catalyst when the alcohol used in the carrier is ethanol; one diffraction line which is more intense appears at 2θ of 5.9±0.4° and one diffraction line which is less intense appears at 2θ of 12.5±0.4° in the X-rays powder diffraction spectrum of the catalyst when the alcohol used in the carrier is propanol; one diffraction line which is more intense appears at 2θ of 5.5±0.4° and one diffraction line which is less intense appears at 2θ of 12.5±0.4° in the X-rays powder diffraction spectrum of the catalyst when the alcohol used in the carrier is butanol; and one intense diffraction line appears at 2θ of 4.8±0.4° in the X-rays powder diffraction spectrum of the catalyst when the alcohol used in the carrier is hexanol. The less intense diffraction line referred to herein has an intensity of 0.10~0.8 times that of the more intense one.

Since there is an extremely small amount of $Ti(OR)_4$ in the carrier according to the present invention, its type will substantially give no effects on the position(s) of the diffraction line(s) of the carrier or the catalyst in the range of 2θ of 2~14°. However, if there is added no titanium alkoxide compound upon the preparation of the carrier, the catalyst component made from the carrier has a very low activity. In fact, the addition of a titanium alkoxide compound during the preparation of the carrier is to better disperse magnesium chloride and facilitate its combination with alcohol.

The carrier according to the present invention can be prepared by contacting-activating α-$MgCl_2$ with an alcohol in an inert hydrocarbon solvent, and more particularly, by a process comprising the steps of:

(1) suspending $MgCl_2$ in an inert hydrocarbon solvent and then sufficiently contacting with a titanium alkoxide compound represented by the formula $Ti(OR)_4$ at a temperature of 30–200° C. for 10 to 200 minutes, with the molar ratio of $Ti(OR)_4$ to $MgCl_2$ being in the range of 0.01–0.1;

(2) adding the product from step (1) under stirring to an alcohol represented by the formula ROH at a temperature of 30–200° C. and then reacting them for 10 to 200 minutes, with the molar ratio of ROH to $MgCl_2$ being in the range of 0.1 to 1.0.

In the preparation process as mentioned above, R in the formula $Ti(OR)_4$ is $C_1 \sim C_7$ alkyl group, preferably $C_2 \sim C_5$ alkyl. The titanium alkoxide compounds represented by the formula $Ti(OR)_4$ can be selected from the group consisting of titanium ethoxide, titanium propoxide and titanium butoxide, and mixtures thereof, with titanium butoxide being the most preferred.

In the preparation process as mentioned above, the alcohol represented by the formula ROH can be $C_1 \sim C_7$ aliphatic alcohol, preferably $C_2 \sim C_5$ alcohol, such as ethanol, propanol or isopropanol, butanol or isobutanol, pentanol and mixtures thereof.

In the preparation process as mentioned above, the inert hydrocarbon solvent can be selected from the group consisting of $C_2 \sim C_{15}$ alkanes or $C_6 \sim C_8$ aromatic hydrocarbons, preferably $C_5 \sim C_{12}$ alkanes, more preferably hexane, decane, heptane or octane. The weight ratio of the inert hydrocarbon solvent to anhydrous magnesium chloride is from 5 to 100, preferably from 5 to 20.

The solid catalyst component can be prepared by a conventional titanium-supporting method in which the carrier according to the present invention is suspended in an inert hydrocarbon solvent, to the suspension is added a compound represented by a formula $Ti(OR_1)_nCl_{4-n}$, wherein n is from 0 to 4, $R_1$ is $C_1$~$C_{12}$ alkyl, preferably $C_2$–$C_4$ alkyl, in an amount such that the molar ratio of magnesium/titanium is 2:1~30, preferably 1:1~10, the resulting mixture is then reacted at a temperature of 30° C. to 200° C., preferably 60° C. to 150° C., for 0.5 to 5.0 hours. At the end of the reaction, the resulting solid is washed with an inert hydrocarbon to remove free titanium compound, thereby giving solid catalyst component particles having a particle size of 1 to 100 microns. The compound represented by a formula $Ti(OR_1)_nCl_{4-n}$ used can be preferably a titanium halide, such as $TiCl_4$, and the resulting solid catalyst component has a titanium content of 0.2 to 20.0 percent by weight, preferably 0.5 to 10 percent by weight. The solid catalyst components according to the present invention can be used as the main catalyst for polymerizing ethylene and copolymerizing ethylene with α-olefins. When used for (co)polymerizing, it is necessary to add as cocatalyst an alkyl aluminum compound, preferably triisobutyl aluminum, triethyl aluminum or tri-n-butyl aluminum, with Al/Ti ratio being suitably 20 to 800, preferably 20 to 300, by mole.

The solid catalyst component according to the present invention is suitable for the homopolymerization or copolymerization of olefins represented by the formula $CH_2$=$CHR_2$, wherein $R_2$ is hydrogen, $C_1$~$C_8$alkyl or $C_6$~$C_8$aryl. The polymerization conditions according to the present invention include a temperature of 30~120° C. and a pressure of 0.1~1.0 MPa. The polymerization can be carried out by gas bulk polymerization process, solvent polymerization process, such as slurry polymerization process, with the polymerization solvent being selected from the group consisting of hexane, heptane or other aliphatic hydrocarbons.

The carrier according to the present invention can be directly reacted with a transition metal compound, without dealcoholization, to obtain the solid catalyst component and only small amounts of the transition metal compound and other chemical reagents are required during the preparation of the catalyst, thus compared with the prior art, the post-treatment involved during the preparation of the catalyst becomes very simple, which is advantageous to the environmental protection. It is particularly noted and is totally unexpected that the catalyst component obtained according to the present invention is in a highly ordered crystalline form, with its X-rays powder diffraction spectrum being characterized in that there are the characteristic sharp peaks of the inactive anhydrous α-$MgCl_2$ and the characteristic peaks of the catalyst, unlike the prior art wherein the anhydrous magnesium chloride exhibits a halo at the most intense peak in its X-rays powder diffraction spectrum, and furthermore, the catalyst provided according to the present invention has high polymerization activity.

EXAMPLES

The following examples illustrate the present invention in more details and the present invention is not limited to them.

The parameters in the Examples are measured as follows:

Bulk Density: GB1636-79

MIF Flow Index: ASTM-D1238

X-rays powder diffraction spectrum: DMAX/IIIA X-rays diffractometer available from Rigaku K. K., Japan, conditions for measurement: $CuK_a$($\lambda$=1.5418), tube voltage 35 kV, tube current 25 mA, receiving slit 0.3 mm, scanning speed 4°/min, scanning from 2° to 50°. Under the protection of nitrogen, the sample to be analyzed is ground and then pressed into tablets, which is placed into a dry polyester-based plastic bag, with the polyester film being 50 microns thick.

Particle sizes of the solid catalysts and the polymers: MASTERSIZE/E type Laser Particle Size Analyzer available from MALVERN Inc., British.

Example 1

To a nitrogen-flushed three-necked flask is placed 40 ml of dry hexane. Then under stirring, 0.30 ml($8.8\times10^{-4}$ mol) of titanium n-butoxide [$Ti(n-C_4H_9O)_4$] (manufactured by Beijing Chemical Factory, Beijing, China) is added to the flask, followed by 2.0 g($2.1\times10^{-2}$ mol) of anhydrous magnesium chloride. The content is heated up to a temperature of 69° C. for refluxing and is stirred at that temperature for 30 minutes. Then 0.6 ml($6.5\times10^{-3}$ mol) of n-butanol is added dropwise with stirring for 30 minutes. After the supernatant is removed, the residue is dried at 30~60° C. for 0.5~2.0 hours to obtain a white powder carrier A with excellent flowability. The carrier A has an average particle size of 16.7 microns and has an X-rays powder diffraction spectrum wherein in the range of $2\theta$ of 2~14°, there is one characteristic diffraction line at $2\theta$ of 5.5°(81.2%), and in the range of $2\theta$ of 14~50°, there are the characteristic diffraction lines of the anhydrous α-$MgCl_2$ at $2\theta$ of 14.7°(100%), 29.7°(40.9%), 34.5°(76.1%), 45.8°(4.8%), and 49.2° (36.8%), with the values in the parenthesis representing the relative intensity of the diffraction lines(the same below).

Example 2

A carrier B is prepared by following the procedure as in example 1 except that titanium n-butoxide is added in an amount of 0.15 ml($4.4\times10^{-4}$ mol). The carrier B has an average particle size of 15.6 microns and has an X-rays powder diffraction spectrum wherein in the range of $2\theta$ of 4~14°, there is one characteristic diffraction line at $2\theta$ of 5.4°(44.4%), and in the range of $2\theta$ of 14~50°, there are the characteristic diffraction lines of the anhydrous α-$MgCl_2$ at $2\theta$ of 14.7°(100%), 29.7°(38.4%), 34.8°(63.0%), 44.4° (7.1%), and 49.2°(35.6%)

Example 3

A carrier C is prepared by following the procedure as in example 1 except that titanium n-butoxide is added in an amount of 0.3 ml($8.8\times10^{-4}$ mol) and n-butanol is added in an amount of 0.8 ml($87.5\times10^{-4}$ mol). The carrier C has an average particle size of 14.8 microns and has an X-rays powder diffraction spectrum as shown in FIG. 1. As shown in FIG. 1, in the range of $2\theta$ of 4~14°, there is one characteristic diffraction line at $2\theta$ of 5.5°(85.6%), and in the range of $2\theta$ of 14~50°, there are the characteristic diffraction lines of the anhydrous α-$MgCl_2$ at $2\theta$ of 14.8°(100%), 29.9°(47.9%), 34.8°(80.5%), 45.8°(5.9%), and 49.9° (40.5%)

Example 4

To a nitrogen-flushed three-necked flask is placed 60 ml of dry hexane. Then under stirring, 0.60 ml($17.6\times10^{-4}$ mol) of titanium n-butoxide is added to the flask, followed by 4.0 g($4.2\times10^{-2}$ mol) of anhydrous magnesium chloride. The content is heated to reflux and is stirred at that temperature for 30 minutes. Then 2 ml($1.6\times10^{-2}$ mol) of n-hexanol is added dropwise with stirring for 30 minutes. After the end of the reaction, the supernatant is removed, and the residue is dried at 30~60° C. for 0.5~2.0 hours to obtain a white powder carrier D with excellent flowability. The carrier D has an average particle size of 15.7 microns and has an X-rays powder diffraction spectrum wherein in the range of 2θ of 2~14°, there is one characteristic diffraction line at 2θ of 4.2°(103%), and in the range of 2θ of 14~50°, there are the characteristic diffraction lines of the anhydrous α-$MgCl_2$ at 2θ of 14.9°(100%), 30.1°(56.2%), 34.8°(77.1%), 45.8° (4.2%), and 49.9°(51.5%).

Example 5

To a nitrogen-flushed three-necked flask is placed 60 ml of dry hexane. Then under stirring, 0.60 ml($17.6\times10^{-4}$ mol) of titanium n-butoxide is added to the flask, followed by 4.0 g($4.2\times10^{-2}$ mol) of anhydrous magnesium chloride. The content is heated to reflux and is stirred at that temperature for 30 minutes. Then 1.26 ml($1.7\times10^{-2}$ mol) of n-propanol is added dropwise with stirring for 30 minutes. After the supernatant is removed, the residue is dried at 30~60° C. for 0.5~2.0 hours to obtain a white powder carrier E with excellent flowability The carrier E has an average particle size of 16.9 microns and has an X-rays powder diffraction spectrum wherein in the range of 2θ of 2~14°, there are two characteristic diffraction lines at 2θ of 5.9°(89.4%) and 10.9°(12.7%), and in the range of 2θ of 14~50°, there are the characteristic diffraction lines of the anhydrous α-$MgCl_2$ at 2θ of 14.9°(100%), 30.0°(52.3%), 34.6°(79.5%), 45.8° (9.5%), and 49.8°(56.6%).

Example 6

To a nitrogen-flushed three-necked flask is placed 60 ml of dry hexane. Then under stirring, 0.60 ml($17.6\times10^{-4}$ mol) of titanium n-butoxide is added to the flask, followed by 4.0 g($4.2\times10^{-2}$ mol) of anhydrous magnesium chloride. The content is heated to reflux and is stirred at that temperature for 30 minutes. Then 1.6 ml($1.7\times10^{-2}$ mol) of isobutanol is added dropwise with stirring for 30 minutes. After the supernatant is removed, the residue is dried at 30~60° C. for 0.5~2.0 hours to obtain a white powder carrier F with excellent flowability. The carrier F has an average particle size of 14.9 microns and has an X-rays powder diffraction spectrum wherein in the range of 2θ of 2~14°, there is one characteristic diffraction line at 2θ of 5.4°(82.3%), and in the range of 2θ of 14~50°, there are the characteristic diffraction lines of the anhydrous a-$MgCl_2$ at 2θ of 14.9°(100%), 30.0°(78.6%), 35.1°(75.9%), 46.2°(6.1%), and 50.1° (38.2%).

Example 7(Comparative)

To a nitrogen-flushed three-necked flask is placed 60 ml of dry hexane. Then under stirring, 0.60 ml($17.6\times10^{-4}$ mol) of titanium n-butoxide is added to the flask, followed by 4.0 g($4.2\times10^{-2}$ mol) of anhydrous magnesium chloride. The content is heated to reflux and is stirred at that temperature for 30 minutes. Then 2.6 ml($1.6\times10^{-2}$ mol) of 2-ethylhexanol is added dropwise with stirring for 30 minutes. After the supernatant is removed, the residue is dried at 30~60° C. for 0.5~2.0 hours to obtain a white powder carrier G with excellent flowability. The carrier G has an average particle size of 13.4 microns and has an X-rays powder diffraction spectrum wherein in the range of 2θ of $_{2\sim14}$°, there is no characteristic diffraction line, and in the range of 2θ of 14~50°, there are the characteristic diffraction lines of the anhydrous α-$MgCl_2$ at 2θ of 14.9°(100%), 30.0°(37.6%), 35.1°(36.2%), 46.2°(4.8%), and 50.1°(21.8%).

Example 8

To a nitrogen-flushed three-necked flask is placed 60 ml of dry hexane. Then under stirring, 0.75 ml($2.2\times10^{-3}$ mol) of titanium n-butoxide is added to the flask, followed by 5.0 g($5.3\times10^{-2}$ mol) of anhydrous magnesium chloride. The content is heated to reflux and is stirred at that temperature for 30 minutes. Then 1.2 ml($2.1\times10^{-2}$ mol) of ethanol is added dropwise with stirring for 30 minutes. After the supernatant is removed, the residue is dried at 30~60° C. for 0.5~2.0 hours to obtain a white powder carrier H with excellent flowability. The carrier H has an average particle size of 16.4 microns and has an X-rays powder diffraction spectrum wherein in the range of 2θ of 2~14°, there is one characteristic diffraction line at 2θ of 7.4°(24.4%), and in the range of 2θ of 14~50°, there are the characteristic diffraction lines of the anhydrous α-$MgCl_2$ at 2θ of 15.3°(69.4%), 30.0°(68.5%), 35.1°(100%), 46.2°(12.1%), and 50.1° (54.7%).

Example 9

To a nitrogen-flushed three-necked flask is placed 60 ml of dry hexane. Then under stirring, 0.48 ml($2.1\times10^{-3}$ mol of titanium tetraethoxide[$TiC_2H_5O)_4$)] (manufactured by Beijing Organic Chemical Factory No. 57601) is added to the flask, followed by 5.0 g($5.3\times10^{-2}$ mol) of anhydrous magnesium chloride. The content is heated to reflux and is stirred at that temperature for 30 minutes. Then 2.0 ml($2.2\times10^{-2}$ mol) of n-butanol is added dropwise with stirring for 30 minutes. After the supernatant is removed, the residue is dried at 30~60° C. for 0.5~2.0 hours to obtain a white powder carrier K with excellent flowability. The carrier K has an average particle size of 15.5 microns and has an X-rays powder diffraction spectrum wherein in the range of 2θ of 2~14°, there is one characteristic diffraction line at 2θ of 5.4°(76.5%), and in the range of 2θ of 14~50°, there are the characteristic diffraction lines of the anhydrous α-$MgCl_2$ at 2θ of 14.9°(100%), 30.0°(47.9%), 35.1°(81.3%), 46.2° (7.4%), and 50.1°(38.6%).

Example 10~18

Figure 2:
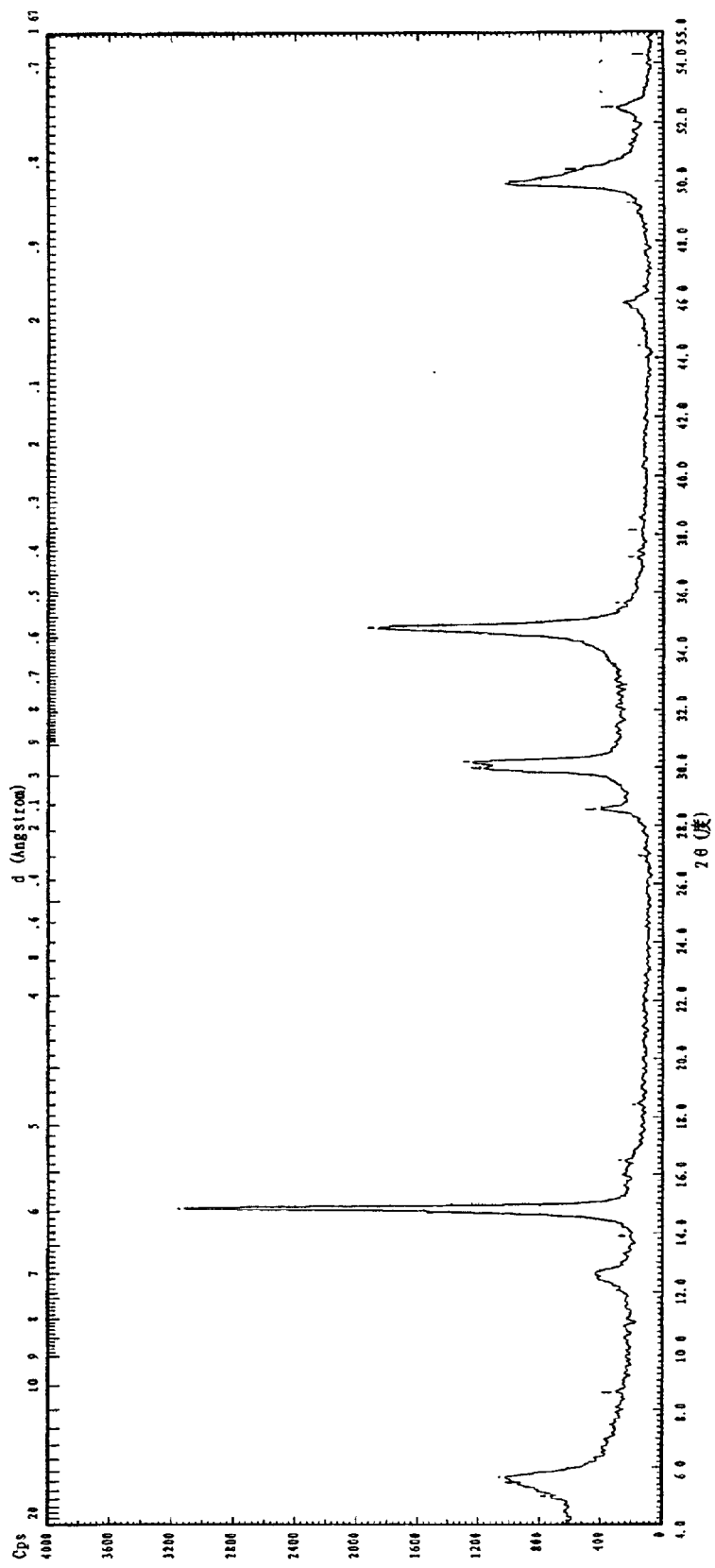
FIG. 2 is an X-rays powder diffraction spectrum of the catalyst component made from the carrier A.

These examples illustrate the solid catalyst components made from the carrier according to the present invention. 2.0 g of the carrier prepared in the above examples is placed in 40 ml of hexane and then to the resulting mixture is added 3 ml of $TiCl_4$. The resulting mixture is heated up to a temperature of 69° C. for refluxing and then reacted at that temperature for 1 hour. At the end of the reaction, the resulting mixture is left standing and then the supernatant is removed. The residue is washed with hexane(4×40 ml) and then dried at 30~60° C. for 0.5~2.0 hours to obtain a solid catalyst component. The carrier from which the solid catalyst component is made, the average particle size and the X-rays powder diffraction spectrum of the catalyst component are listed in Table 1. The X-rays powder diffraction spectrum of the catalyst made from the carrier A is shown in FIG. 2.

Examples 19–27

In these examples, ethylene is polymerized under normal pressure so as to study the reaction activity of the solid catalyst components.

A 500 ml three-necked flask equipped with a stirrer and a thermostatic system is displaced three times with nitrogen and then once with ethylene, and 200 ml of hexane, 2 ml of 1.5 mol/l solution of triethyl aluminum in hexane and 30 mg of a solid catalyst component are then added into the flask. The stirrer is started and then ethylene gas is fed. The polymerization is conducted at a temperature of 40° C. and a pressure of 0.1 MPa for 2 hours and then is quenched by 2 ml of ethanol to obtain polyethylene particles which can flow easily. The activity of the catalyst component is listed in Table 2.

Examples 28–30

In these examples, ethylene is polymerized under high pressure so as to study the reaction activity of the catalyst component.

To a 2 liters autoclave is added 1 liter of dry hexane under an atmosphere of nitrogen, followed by a catalyst slurry containing 0.01 mmol Ti and 1.0 ml of 1.0 mol/l solution of triethyl aluminum in hexane. The reaction mixture is heated up to 80° C. and then to the autoclave are fed hydrogen and ethylene so that the ratio of the partial pressure of hydrogen to that of ethylene is 0.28:0.45. Ethylene is then continuously fed to the autoclave for 2 hours so that the total pressure inside the autoclave is maintained at 0.7 MPa. At the end of polymerization, polymers are isolated from hexane and dried to obtain polyethylene particles which can flow easily. The activity of the catalyst component and the properties of the polymers are listed in Table 3.

TABLE 1

| Ex. No. | Carrier used — Alcohol No. | Carrier used — Alcohol contained | Catalyst No. | Average Particle Size of the catalyst, μm | X-rays powder diffraction spectrum of the solid catalyst component (2θ in range of 2~50°) |
|---|---|---|---|---|---|
| 10 | A | n-butanol | a | 9.8 | 5.6° (19.4%), 12.6° (8.0%), 14.8° (100%), 30.2° (35.9%), 34.7° (57.9%), 45.8° (5.7%), 49.9° (31.4%) |
| 11 | B | n-butanol | b | 6.6 | 5.4° (30.5%), 12.9° (18.4%), 14.7° (100%), 29.8° (33.8%), 34.1° (56.1%), 44.1° (6.8%), 49.3° (30.8%) |
| 12 | C | n-butanol | c | 13.6 | 5.5° (44.0%), 12.5° (23.6%), 14.7° (100%), 30.9° (37.6%), 34.6° (67.3%), 49.9° (33.6%) |
| 13 | D | n-hexanol | d | 15.7 | 4.8° (100%), 14.9° (78.2%), 30.0° (49.9%), 34.7° (67.1%), 49.9° (48.1%) |
| 14 | E | n-propanol | e | 16.9 | 5.9° (48.9%), 12.5° (13.3%), 14.9° (100%), 30.1° (48.2%), 34.8° (70.5%), 49.8° (57.4%) |
| 15 | F | iso-butanol | f | 14.9 | 5.4° (26.7%), 12.2° (9.8%), 14.6° (100%), 29.8° (48.2%), 34.5° (54.4%), 49.8° (46.2%) |
| 16 | G | octanol | g | 13.4 | 14.9° (100%), 30.2° (41.4%), 34.7° (47.1%), 50.2° (38.7%) |
| 17 | H | ethanol | h | 16.4 | 5~6.5° (appearing as a halo), 14.9° (100%), 30.0° (43.0%), 34.8° (65.4%), 49.9° (40.7%) |
| 18 | K | n-butanol | k | 15.5 | 5.5° (75.1%), 12.4° (28.1%), 15.0° (100%), 30.0° (75.8%), 34.7° (84.3%), 49.9° (56.2%) |

TABLE 2

| Ex. No. | Catalyst No. | Ti content, wt % | Catalytic Activity g PE/g Cat. | Catalytic Activity g PE/g Ti |
|---|---|---|---|---|
| 19 | a | 5.16 | 2250 | 43605 |
| 20 | b | 5.55 | 1550 | 31762 |
| 21 | c | 6.22 | 2550 | 40996 |
| 22 | d | 7.92 | 1700 | 21465 |
| 23 | e | 5.85 | 1400 | 23930 |
| 24 | f | 8.15 | 1800 | 22085 |
| 25 | g | 3.86 | 248 | 6424 |
| 26 | h | 5.82 | 921 | 15824 |
| 27 | k | 5.38 | 1200 | 22304 |

TABLE 3

| | Catalyst Component | | Polyethylene | | | | | | |
|---|---|---|---|---|---|---|---|---|---|
| | | Activity, | Melt | Bulk | Particle Size ($\mu$m), wt % | | | | |
| Ex No. | No. | g Polyethylene/ g Ti | Index, $MI_{2.16}$ | Density, g/ml | >830 | 830– 350 | 350– 147 | 147– 74 | <74 |
| 28 | a | 826000 | 1.10 | 0.31 | 2.8 | 13.7 | 62.0 | 17.6 | 3.8 |
| 29 | b | 650000 | 0.98 | 0.34 | 3.0 | 20.0 | 62.0 | 16.0 | 1.0 |
| 30 | c | 709000 | 1.54 | 0.32 | 1.0 | 22.0 | 60.0 | 14.0 | 1.5 |

What is claimed is:

1. A magnesium chloride based carrier containing a titanium alkoxide compound represented by the formula Ti(OR)$_4$ and an alcohol represented by the formula ROH, wherein R is C$_1$–C$_7$ alkyl, characterized in that in the X-rays powder diffraction spectrum of the carrier, one or two main diffraction lines appear at 2θ of 2–14° and in the range of 2θ of 14–50° there are the characteristic diffraction lines of anhydrous α-MgCl$_2$.

2. The carrier according to claim 1, characterized in that in said carrier, the molar ratio of said titanium alkoxide compound represented by the formula Ti(OR)$_4$ to MgCl$_2$ is 0.01–0.1, the molar ratio of said alcohol represented by the formula ROH to MgCl$_2$ is 0.01–1.0, wherein R is C$_2$–C$_5$ alkyl.

3. The carrier according to claim 2, characterized in that said titanium alkoxide compound represented by the formula Ti(OR)$_4$ is titanium butoxide or titanium ethoxide.

4. The carrier according to claim 1, characterized in that the intensity of the main diffraction line or the intensity of the more intense one of the main diffraction lines of said carrier appearing in a range of 2θ of 2–14° is 0.2–1.5 times that of the diffraction line at 2θ of 14.9±0.4°.

5. The carrier according to claim 1, characterized in that one main diffraction line appears at 2θ of 7.4±0.4° when the alcohol used in the carrier is ethanol, and in the range of 2θ of 14–50°, there are the characteristic diffraction lines of anhydrous α-MgCl$_2$.

6. The carrier according to claim 1, characterized in that one diffraction line which is more intense appears at 2θ of 5.9±0.4° and one diffraction line which is less intense appears at 2θ of 10.9±0.4° when the alcohol used in the carrier is propanol, and in the range of 2θ of 14–50°, there are the characteristic diffraction lines of anhydrous α-MgCl$_2$.

7. The carrier according to claim 1, characterized in that one intense diffraction line appears at 2θ of 5.4±0.4° when the alcohol used in the carrier is butanol, and in the range of 2θ of 14–50°, there are the characteristic diffraction lines of anhydrous α-MgCl$_2$.

8. The carrier according to claim 1, characterized in that one diffraction line appears at 2θ of 4.2–0.4° when the alcohol used in the carrier is hexanol, and in the range of 2θ of 14–50°, there are the characteristic diffraction lines of anhydrous α-MgCl$_2$.

9. A solid catalyst component for olefin polymerization, prepared by reacting the carrier according to claim 1 with a transition metal compound in an inert hydrocarbon solvent, characterized in that in the X-rays powder diffraction spectrum of the catalyst component, one or two main diffraction lines or a halo appears at 2θ of 2–14° and in the range of 2θ of 14–50° the characteristic diffraction lines of anhydrous α-MgCl$_2$.

10. The catalyst component according to claim 9, characterized in that said transition metal compound is represented by the formula Ti(OR$_1$)$_n$Cl$_{4-n}$, wherein n is from 0 to 4, R$_1$ is C$_1$–C$_{12}$ alkyl, and that the titanium content in the solid catalyst component is 0.5–10 wt%.

11. The catalyst component according to claim 9, characterized in that the intensity of the main diffraction line or the intensity of the more intense one of the main diffraction lines of said catalyst component appearing in a range of 2θ of 2–14° is 0.1–1.5 times that of the diffraction line at 2θ of 14.9±0.4°.

12. The catalyst component according to claim 9, characterized in that one diffraction line which is more intense appears at 2θ of 5.5±0.4° and one diffraction line which is less intense appears at 2θ of 12.5±0.4° in the X-rays powder diffraction spectrum of the catalyst when the alcohol used in the carrier is butanol.

13. The catalyst component according to claim 9, characterized in that one diffraction line which is more intense appears at 2θ of 5.9±0.4° and one diffraction line which is less intense appears at 2θ of 12.5±0.4° in the X-rays powder diffraction spectrum of the catalyst when the alcohol used in the carrier is propanol.

14. The catalyst component according to claim 9, characterized in that one intense diffraction line appears at 2θ of 4.8±0.4° in the X-rays powder diffraction spectrum of the catalyst when the alcohol used in the carrier is hexanol.

15. The catalyst component according to claim 9, characterized in that a halo appears at 2θ of 5–7° in the X-rays powder diffraction spectrum of the catalyst when the alcohol used in the carrier is ethanol.

16. The carrier according to claim 1, characterized in that said titanium alkoxide compound represented by the formula Ti(OR)$_4$ is titanium butoxide or titanium ethoxide.

* * * * *